United States Patent
Dubuque et al.

(10) Patent No.: US 10,882,217 B2
(45) Date of Patent: Jan. 5, 2021

(54) MULTI-LAYER PREFORM AND CONTAINER

(71) Applicant: AMCOR RIGID PACKAGING USA, LLC, Ann Arbor, MI (US)

(72) Inventors: William J. Dubuque, Dexter, MI (US); Luke A. Mast, Brooklyn, MI (US); Frederick C. Beuerle, Jackson, MI (US); Kirk Edward Maki, Tecumseh, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 189 days.

(21) Appl. No.: 16/091,560

(22) PCT Filed: Apr. 5, 2017

(86) PCT No.: PCT/US2017/026100
§ 371 (c)(1),
(2) Date: Oct. 5, 2018

(87) PCT Pub. No.: WO2017/176859
PCT Pub. Date: Oct. 12, 2017

(65) Prior Publication Data
US 2019/0105805 A1    Apr. 11, 2019

Related U.S. Application Data

(60) Provisional application No. 62/318,848, filed on Apr. 6, 2016.

(51) Int. Cl.
*B29B 11/14* (2006.01)
*B29B 11/08* (2006.01)
(Continued)

(52) U.S. Cl.
CPC .............. *B29B 11/14* (2013.01); *B29B 11/08* (2013.01); *B29C 45/77* (2013.01); *B29C 49/06* (2013.01);
(Continued)

(58) Field of Classification Search
CPC ... B29C 49/221; B29C 49/2408; B29C 49/24; B29C 49/4904; B65D 1/0215;
(Continued)

(56) References Cited

U.S. PATENT DOCUMENTS 3,401,475 A * 9/1968 Morehouse ............... G09F 3/10
40/306
3,542,229 A * 11/1970 Merz .................... B65D 1/0215
215/12.2
(Continued)

FOREIGN PATENT DOCUMENTS

WO    018193 A1    11/2001
WO    03035368 A1    5/2003

OTHER PUBLICATIONS

International Search Report and Written Opinion issued in PCT/US2017/026100, dated Jun. 20, 2017; ISA/KR.
(Continued)

*Primary Examiner* — Ernesto A Grano
(74) *Attorney, Agent, or Firm* — Harness, Dickey & Pierce, P.L.C.

(57) ABSTRACT

A container including a finish at a first end of the container defining an opening. A base is at a second end of the container that is opposite to the first end. A shoulder extends from the finish. A body defines an internal volume and extends from the shoulder to the base. A single layer material portion of the container extends from the first end to form at least a portion of the finish. A multi-layer material portion of the container extends from the single layer material portion
(Continued)

to the second end of the container and across the base. A transition area is spaced apart from the first end where the single layer material portion transitions to the multi-layer material portion.

15 Claims, 5 Drawing Sheets

(51) Int. Cl.
  *B29C 49/22*  (2006.01)
  *B29C 45/77*  (2006.01)
  *B29C 49/06*  (2006.01)
  *B65D 1/02*  (2006.01)
  *B29L 31/00*  (2006.01)
  *B29K 101/12*  (2006.01)

(52) U.S. Cl.
  CPC .......... *B29C 49/221* (2013.01); *B65D 1/0215* (2013.01); *B65D 1/0246* (2013.01); *B29B 2911/141* (2013.01); *B29B 2911/1402* (2013.01); *B29B 2911/1408* (2013.01); *B29B 2911/1414* (2013.01); *B29B 2911/14026* (2013.01); *B29B 2911/14336* (2015.05); *B29B 2911/14337* (2015.05); *B29C 2793/009* (2013.01); *B29C 2793/0027* (2013.01); *B29C 2945/76545* (2013.01); *B29C 2945/76859* (2013.01); *B29K 2101/12* (2013.01); *B29L 2031/716* (2013.01)

(58) Field of Classification Search
  CPC .............. B65D 1/0207; B65D 23/0864; B29B 2911/1402; B29B 2911/1408; B29B 2911/14573
  USPC ......................................... 215/12.2; 264/239
  See application file for complete search history.

(56) References Cited

U.S. PATENT DOCUMENTS

| | | | | |
|---|---|---|---|---|
| 3,698,586 | A * | 10/1972 | Terner | B65D 23/0878 215/12.2 |
| 3,912,100 | A * | 10/1975 | Graham | B65D 23/0878 215/12.2 |
| 3,950,199 | A * | 4/1976 | Lucas | B05C 5/001 156/86 |
| 3,955,020 | A * | 5/1976 | Cavanagh | B65D 23/0814 428/34.7 |
| 3,967,993 | A * | 7/1976 | Isomi | B65D 23/0878 156/86 |
| 4,007,246 | A * | 2/1977 | Bailey | B29C 63/426 264/129 |
| 4,079,850 | A * | 3/1978 | Suzuki | B29C 49/22 215/12.2 |
| 4,256,231 | A * | 3/1981 | Cioc | B29C 49/22 215/12.2 |
| 4,454,945 | A * | 6/1984 | Jabarin | B65D 1/0215 206/524.3 |
| 4,573,596 | A * | 3/1986 | Slat | B29C 49/24 215/12.2 |
| 4,609,516 | A * | 9/1986 | Krishnakumar | B29C 45/1643 264/255 |
| 4,646,925 | A * | 3/1987 | Nohara | B29C 45/1643 215/12.2 |
| 4,979,631 | A * | 12/1990 | Krishnaukumar | B29C 49/22 206/524.2 |
| 5,079,057 | A * | 1/1992 | Heider | B29C 49/24 215/386 |
| 5,344,045 | A * | 9/1994 | Richter | B65D 1/0215 215/12.2 |
| 5,411,698 | A * | 5/1995 | Mero | B29C 49/18 264/521 |
| 5,464,106 | A * | 11/1995 | Slat | B29C 49/0073 215/12.1 |
| 5,628,957 | A * | 5/1997 | Collette | B29C 49/0005 264/512 |
| 5,906,285 | A * | 5/1999 | Slat | B29C 49/221 215/12.1 |
| 5,914,138 | A * | 6/1999 | Swenson | B29C 45/1642 425/130 |
| 5,968,620 | A * | 10/1999 | Harvey | C08J 7/0423 428/35.9 |
| 6,070,750 | A * | 6/2000 | Kubitz | B65D 25/36 220/619 |
| 6,123,211 | A * | 9/2000 | Rashid | B29B 11/08 215/12.1 |
| 6,312,641 | B1 * | 11/2001 | Hutchinson | B29C 45/1625 220/62.22 |
| 6,352,426 | B1 * | 3/2002 | Hutchinson | B29C 45/045 425/548 |
| 6,372,318 | B1 * | 4/2002 | Collette | B29C 49/12 215/375 |
| 6,386,387 | B1 * | 5/2002 | Hwang | A47G 19/2288 215/13.1 |
| 6,391,408 | B1 * | 5/2002 | Hutchinson | B32B 27/08 428/35.7 |
| 6,461,697 | B1 * | 10/2002 | Slat | B29C 45/14778 215/12.2 |
| 6,461,699 | B1 * | 10/2002 | Slat | B29C 49/0005 215/12.1 |
| 6,474,499 | B2 * | 11/2002 | Donelson | B65D 23/001 220/592.21 |
| 6,517,664 | B1 * | 2/2003 | Dronzek, Jr. | C09J 7/29 156/328 |
| 6,524,672 | B1 * | 2/2003 | Slat | B29C 49/0073 215/12.2 |
| 6,548,133 | B2 * | 4/2003 | Schmidt | B29C 45/1646 215/12.2 |
| 6,551,544 | B1 * | 4/2003 | Singleton | B29C 49/58 264/536 |
| 6,808,820 | B2 * | 10/2004 | Lee | C23C 16/402 428/480 |
| 6,933,055 | B2 | 8/2005 | Share et al. | |
| 7,150,902 | B2 * | 12/2006 | Farha | C09D 171/00 428/36.6 |
| 7,225,598 | B2 * | 6/2007 | Paoletti | B65D 55/0854 206/807 |
| 7,370,788 | B1 * | 5/2008 | Otani | B65D 1/0207 229/406 |
| 7,588,808 | B2 | 9/2009 | Hutchinson et al. | |
| 7,717,057 | B2 * | 5/2010 | Hutchinson | B05D 7/546 118/412 |
| 7,717,697 | B2 * | 5/2010 | Hutchinson | B29C 45/7312 425/552 |
| 7,727,605 | B2 | 6/2010 | Darr et al. | |
| 8,038,023 | B2 * | 10/2011 | Moore | B65D 77/225 220/89.2 |
| 8,636,159 | B2 * | 1/2014 | Toyoda | B32B 27/306 215/12.2 |
| 9,211,993 | B2 * | 12/2015 | Tom | B65D 1/0215 |
| 9,227,761 | B2 * | 1/2016 | Knaack | B65D 23/0885 |
| 10,083,634 | B2 * | 9/2018 | Freund | G09F 3/02 |
| 2002/0166833 | A1 | 11/2002 | David Shelby | B29C 49/24 215/12.1 |
| 2003/0031814 | A1 * | 2/2003 | Hutchinson | B29C 49/221 428/35.7 |
| 2004/0151937 | A1 * | 8/2004 | Hutchinson | B29C 49/221 428/542.8 |
| 2005/0194280 | A1 * | 9/2005 | Smith | G09F 3/04 206/459.5 |
| 2006/0073294 | A1 * | 4/2006 | Hutchinson | F16L 55/1157 428/35.7 |
| 2006/0210746 | A1 * | 9/2006 | Shi | B29B 11/08 428/35.7 |
| 2009/0220717 | A1 * | 9/2009 | Wilczak | B05D 7/02 428/36.6 |

(56) References Cited

U.S. PATENT DOCUMENTS

| | | |
|---|---|---|
| 2010/0133721 A1 | 6/2010 | Armstrong et al. |
| 2012/0061344 A1 | 3/2012 | Hutchinson et al. |
| 2015/0197370 A1* | 7/2015 | Jang .......................... B32B 7/12 |
| | | 428/35.7 |
| 2019/0337217 A1* | 11/2019 | Suga ...................... B65D 23/08 |

OTHER PUBLICATIONS

European Search Report dated Novmeber 21, 2019 issued in corresponding European Patent Application No. 177797271 (5 pages).

* cited by examiner

Page number: US 10,882,217 B2

MULTI-LAYER PREFORM AND CONTAINER

CROSS REFERENCE TO RELATED APPLICATIONS

This application is a U.S. National Phase Application under 35 U.S.C. 371 of International Application No. PCT/US2017/026100 filed on Apr. 5, 2017. This application claims the benefit of U.S. Provisional Application No. 62/318,848 filed on Apr. 6, 2016. The entire disclosures of both of the above applications are incorporated herein by reference.

FIELD

The present disclosure relates to a multi-layer container preform and container.

BACKGROUND

This section provides background information related to the present disclosure, which is not necessarily prior art.

While current containers are suitable for their intended use, they are subject to improvement. For example, a container/preform exhibiting at least the following features would be desirable: reduced haze; improved crystallinity; less likely to be degraded by heat; reduced possibility of delamination; improved product shelf life; improved barrier efficiency; improved barrier properties at gate area; improved color appearance; and a preform for a container exhibiting such features that can be used for injected finish or blow-trim finish containers. The present teachings advantageously provide containers and preforms exhibiting these features, and numerous others.

As a result of environmental and other concerns, plastic containers, more specifically polyester and even more specifically polyethylene terephthalate (PET) containers, are being used more than ever to package numerous commodities previously supplied in glass containers. Manufacturers and fillers, as well as consumers, have recognized that PET containers are lightweight, inexpensive, recyclable, and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = (\rho - \rho_a / \rho_c - \rho_a) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque (also referred to as haze), and thus generally undesirable. Used after mechanical processing, however, thermal processing results in higher crystallinity and excellent clarity for those portions of the container having biaxial molecular orientation.

SUMMARY

This section provides a general summary of the disclosure, and is not a comprehensive disclosure of its full scope or all of its features.

The present teachings provide for a container including a finish at a first end of the container defining an opening. A base is at a second end of the container that is opposite to the first end. A shoulder extends from the finish. A body defines an internal volume and extends from the shoulder to the base. A single layer material portion of the container extends from the first end to form at least a portion of the finish. A multi-layer material portion of the container extends from the single layer material portion to the second end of the container and across the base. A transition area is spaced apart from the first end where the single layer material portion transitions to the multi-layer material portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
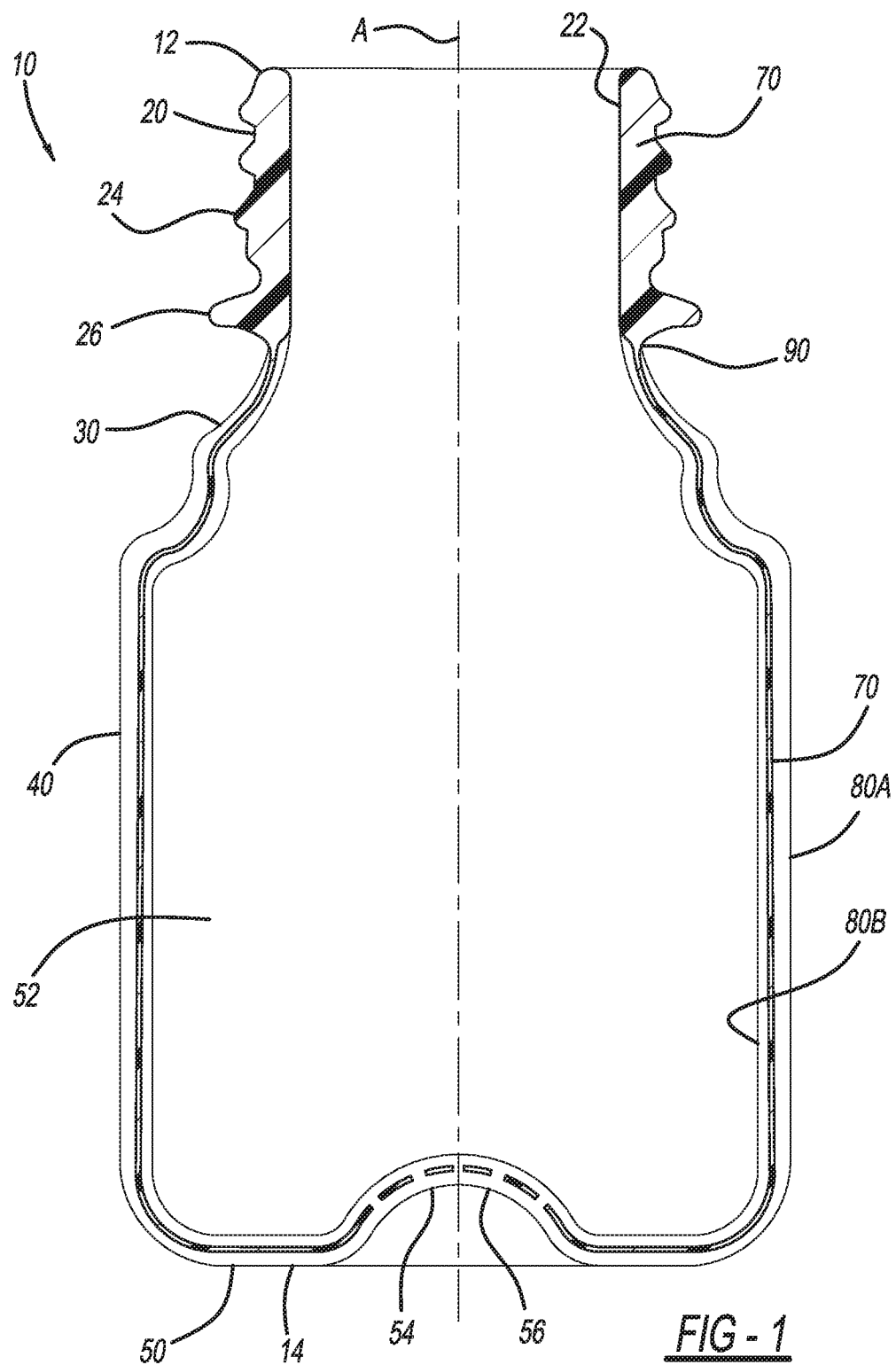
FIG. 1 is a cross-sectional view of a container according to the present teachings.

With initial reference to FIG. 1, a container according to the present teachings is generally illustrated at reference numeral 10. The container 10 can have any suitable shape or size for storing any suitable product, such as any suitable liquid product. The illustration of the container 10 is provided for exemplary purposes only, and the present teachings are not limited to any particular container shape or preform.

Although the container 10 is illustrated as being generally elongated when viewed from a side thereof, the present teachings encompass containers of any suitable shape, such as rectangular, triangular, pentagonal, hexagonal, octagonal, polygonal, or square-shaped containers, which may have any suitable dimensions and volume capacities. Any other modifications can be made depending on specific application and environmental requirements. The present teachings provide utility for a wide range of preform and container configurations, including containers having a flexible, collapsible, or otherwise configured base, sidewalls, and/or shoulder regions effectively absorbing internal vacuum forces resulting from a hot-fill operation.

With respect to the exemplary container 10 illustrated in FIG. 1, the container 10 generally includes a first end 12 and a second end 14, which is opposite to the first end 12. A longitudinal axis A of the container 10 extends from the first end 12 to the second end 14 along an axial center of the container 10.

The container 10 includes a finish 20, which defines an opening 22 of the container 10 at the first end 12. The finish 20 extends away from the first end 12 towards the second end 14. Threads 24 extend from an exterior surface of the finish 20. The threads 24 are configured in any suitable manner to cooperate with any suitable closure in order to retain the closure at the first end 12 across the opening 22, so as to close the container 10. In place of, or in addition to, the threads 24, the finish 20 can include any other suitable retention member configured to secure a closure across the opening 22. The threads 24 are arranged between the first end 12 and a flange 26. The flange 26 can be included to facilitate retention of a preform of the container 10, such as the preform 110 of FIG. 2 described herein, in a mold during a blow molding process for forming the container.

Extending away from the finish 20 towards the second end 14 is a shoulder 30. The shoulder 30 tapers outward and away from the longitudinal axis A. The shoulder 30 extends to a body portion 40 of the container 10.

The body portion 40 extends from the shoulder 30 to a base 50 of the container 10. The finish 20, shoulder 30, body 40, and base 50 combine to define an internal volume 52 of the container 10, in which any suitable product may be stored. The base 50 provides a standing surface for the container 10, and generally includes a center push-up portion 54, and a gate 56. The gate 56 is generally at a center of the center push-up portion 54. The longitudinal axis A typically extends through a center of the gate 56.

The container 10 includes a single layer material portion extending from the first end 12 to form at least a portion of the finish 20. The container 10 further includes a multi-layer material portion, which extends from the single layer material portion to the second end 14 and across the base 50. The single and multi-layer material portions will now be described in detail.

The single layer material portion is formed of an inactive material, portion, or layer 70. The multi-layer material portion is formed of an active material, portion, or layer, which includes an outer active material 80A at an exterior of the container 10, an inner active material 80B at an interior of the container 10, and the inactive material 70, which is arranged as an intermediate layer between the outer and inner active materials 80A and 80B. If required, any suitable bonding agent can be provided between each one of the outer and inner active materials 80A and 80B and the inactive material 70 therebetween, or blended with each one of the outer and inner active materials 80A and 80B and the inactive material 70. In one embodiment the inactive material 70 at the single layer material portion transitions at a transition area 90 to the multi-layer material portion including the outer and inner active materials 80A and 80B with the inactive material 70 therebetween. The transition area 90 can be at any suitable location, such as at the finish 20 spaced apart from the first end 12, at the shoulder 30, or at the body 40. In another embodiment, the inactive material 70 and the outer and inner active materials 80A and 80B with the inactive material 70 therebetween are continuous throughout the entire container 10 and preform 110.

The inactive material 70 can be made of any suitable material, such as a single polymeric material or a blend of polymeric materials. Suitable polymeric materials include polyethylene terephthalate, low-density polyethylene, high-density polyethylene, polypropylene, and polystyrene. Thus the inactive material 70 generally does not provide active properties, such as an oxygen barrier, carbon dioxide barrier or ultraviolet light inhibitor. The inactive material 70 may or may not include post-consumer regrind (PCR). The inactive material 70 may or may not include a colorant additive. The inactive material 70 can have any suitable thickness in any direction, such as in a vertical direction extending generally parallel to the longitudinal axis A, as well as a horizontal direction extending generally perpendicular to the longitudinal axis A.

Each one of the outer and inner active materials 80A and 80B can include a first polymeric material combined with a second polymeric material that is different from the first polymeric material. Each one of the outer and inner active materials 80A and 80B can include a first polymeric material combined with an active agent. Each one of the outer and inner active materials 80A and 80B can include a first polymeric material combined with a second polymeric material that is different from the first polymeric material, and an active agent. The first polymeric material can be any suitable polymeric material or a blend of materials, such as polyethylene terephthalate, low-density polyethylene, high-density polyethylene, polypropylene, or polystyrene. The second polymeric material can include a different one of the following polymeric materials, or any other suitable polymeric material or blend that is different from the first polymeric material: polyethylene terephthalate, low-density polyethylene, high-density polyethylene, polypropylene, or polystyrene. The active agent can be any suitable active agent that is combined with each one of the outer and inner active materials 80A and 80B, and configured in any suitable manner as an oxygen barrier, a carbon dioxide barrier, colorant, and/or an ultraviolet light inhibitor, and may also include any suitable post-consumer regrind material. When configured as a barrier, the active agent can be an active scavenger or a passive blocker. The compositions of each one of the outer and inner active materials 80A and 80B, as well as the inactive material 70 therebetween, can be configured in any suitable manner in order to optimize melt flow rate, melt temperature, intrinsic viscosity, and other mechanical properties to facilitate injecting and blow molding of the preform 110 and container 10. For example, when configured as an oxygen barrier layer, the outer and inner active materials 80A and 80B can include: HyGuard™ by PolyOne Corporation; OxyClear™ by Invista; or PolyProtect™ by M&G. In addition to including the outer and inner active materials 80A and 80B with the intermediate inactive material 70 therebetween, the multi-layer material portion can include any other suitable layers, such as any suitable layers on a side of the outer and/or inner active materials 80A and 80B that is opposite to the intermediate inactive material 70.

Figures 5A, 5B, 5C:
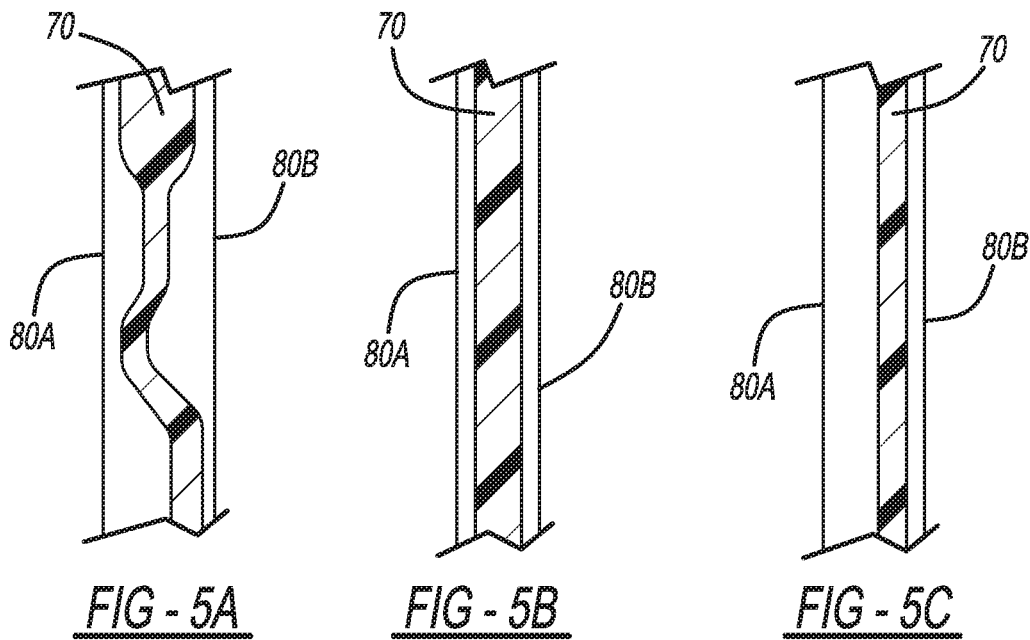
FIG. 5A illustrates an inactive material of a preform according to the present teachings varying in thickness in a direction extending generally parallel to the longitudinal axis A.
FIG. 5B illustrates an inactive material of a preform according to the present teachings having a thickness that is greater than surrounding outer and inner active materials.
FIG. 5C illustrates an inactive material of a preform according to the present teachings biased towards an interior of the preform such that an inner active material is not as thick as an outer active material.

The multi-layer material portion can have any suitable thickness. Thus, each one of the outer and inner active materials 80A and 80B, and the inactive material 70 therebetween, can have any suitable thickness, and can vary in thickness vertically in a direction extending generally parallel to the longitudinal axis A, as well as horizontally in a direction extending generally perpendicular to the longitudinal axis A. FIG. 5A is an exemplary illustration of the inactive material 70 varying in thickness in a direction extending generally parallel to the longitudinal axis A. FIG. 5B illustrates the intermediate inactive material 70 as optionally thicker than each one of the outer and inner active materials 80A and 80B. With reference to FIG. 5C, the inactive material 70 need not be centered between the outer and inner active materials 80A and 80B, but can instead be biased closer towards an interior of the preform 10 and the inner active material 80B can have a reduced thickness as compared to the outer active material 80B, as illustrated in FIG. 5C. Alternatively, the inactive material 70 can be biased closer towards an exterior of the preform 10 and the outer active material 80A can have a reduced thickness as compared to the inner active material 80B.

The arrangement of the inactive material 70, the outer active material 80A, the inner active material 80B, and the transition area 90 according to the present teachings provides numerous advantages. For example, arranging the outer and inner active materials 80A and 80B on the opposite sides of the inactive material 70 reduces degradation of the outer and inner active materials 80A and 80B caused by heat, because the outer and inner active materials 80A and 80B cool faster than the intermediate inactive material layer 70 when the container 10 and the preform 110 are being formed. This can reduce opaque haze of the container 10 caused by heat induced crystallinity at nucleation sites and/or breakdown of active materials causing cloudy regions. Cooling the outer and inner active materials 80A and 80B will quickly minimize crystallinity growth.

Arranging the single layer of the inactive material 70 such that it extends from the first end 12, and arranging the transition area 90 spaced apart from the first end 12, advantageously reduces the possibility that the container 10 will experience delamination. Providing the outer and inner active materials 80A and 80B advantageously increases the volume of active material as compared to if only a single intermediate layer of active material is included, which advantageously provides a longer product shelf life. Providing two barrier layers in the form of the outer and inner active material layers 80A and 80B with the inactive material 70 therebetween advantageously increases the shelf life of contents of the container 10 because such a structure creates a tortuous path of two or more active layers for oxygen and carbon dioxide to penetrate, which improves the barrier properties of the container 10. By covering the gate 56 with the outer and inner active materials 80A and 80B, the barrier properties of the container are further enhanced.

Figure 2:
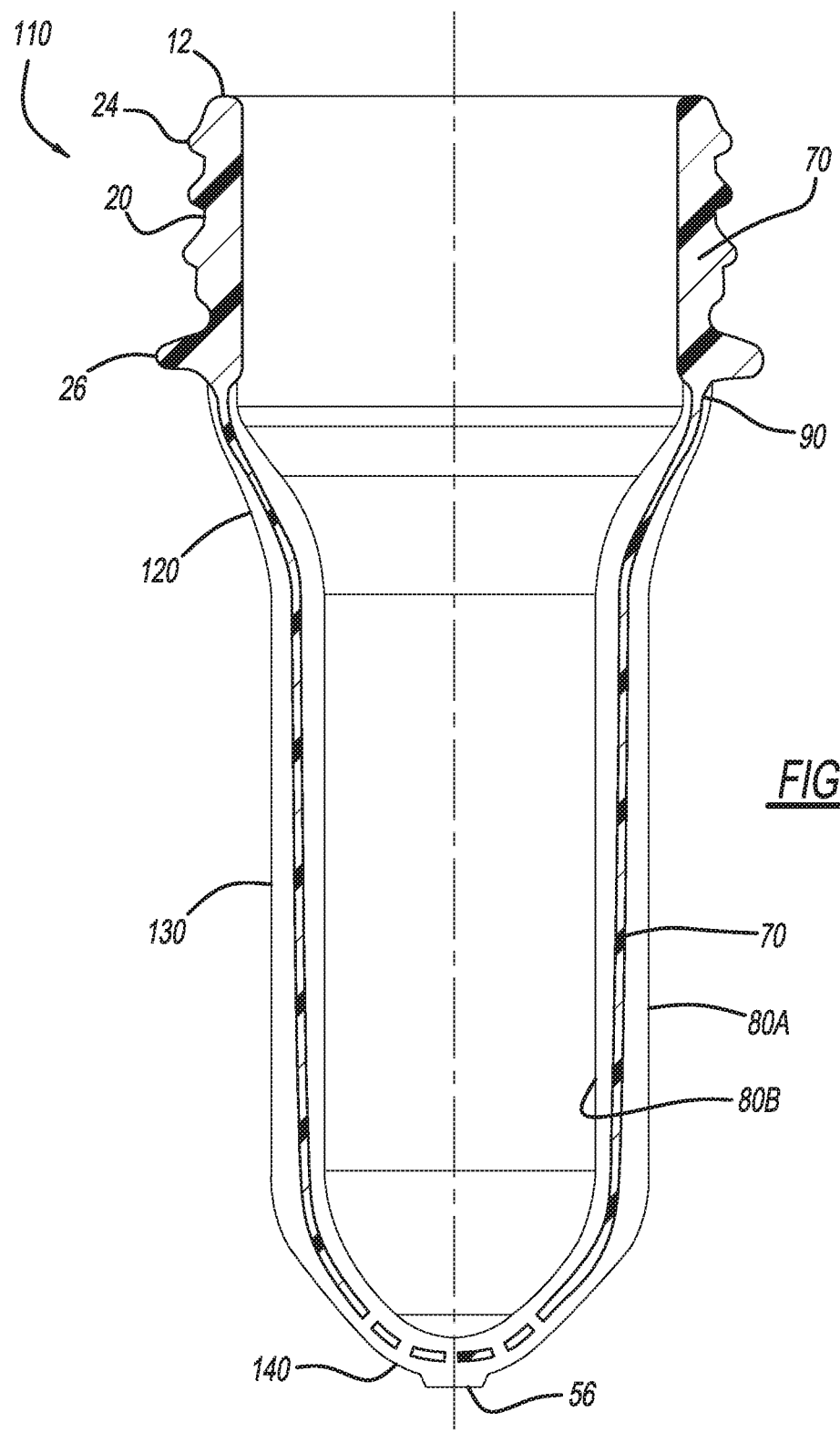
FIG. 2 is a cross-sectional view of a preform according to the present teachings having an injected finish, the preform is configured to form the container of FIG. 1.

FIG. 2 illustrates an exemplary preform 110 configured to form the container 10 by injection blow molding. The preform 110 includes the finish 20 of the container 10, as well as the threads 24. The finish 20 is formed by injection blow molding. Specifically, the inactive material 70 is injected through a mold gate at the gate 56 in order to form at least a portion of the finish 20. Each one of the outer active material 80A, the inner active material 80B, and the inactive material 70 are also injected through the mold gate at the gate 56 in order to form the multi-layer material portion. The inactive material 70 is injected such that it is continuous with the portion thereof at the finish 20. The transition area 90 can be provided at any suitable location of the preform 110 spaced apart from the first end 12.

Figure 6:
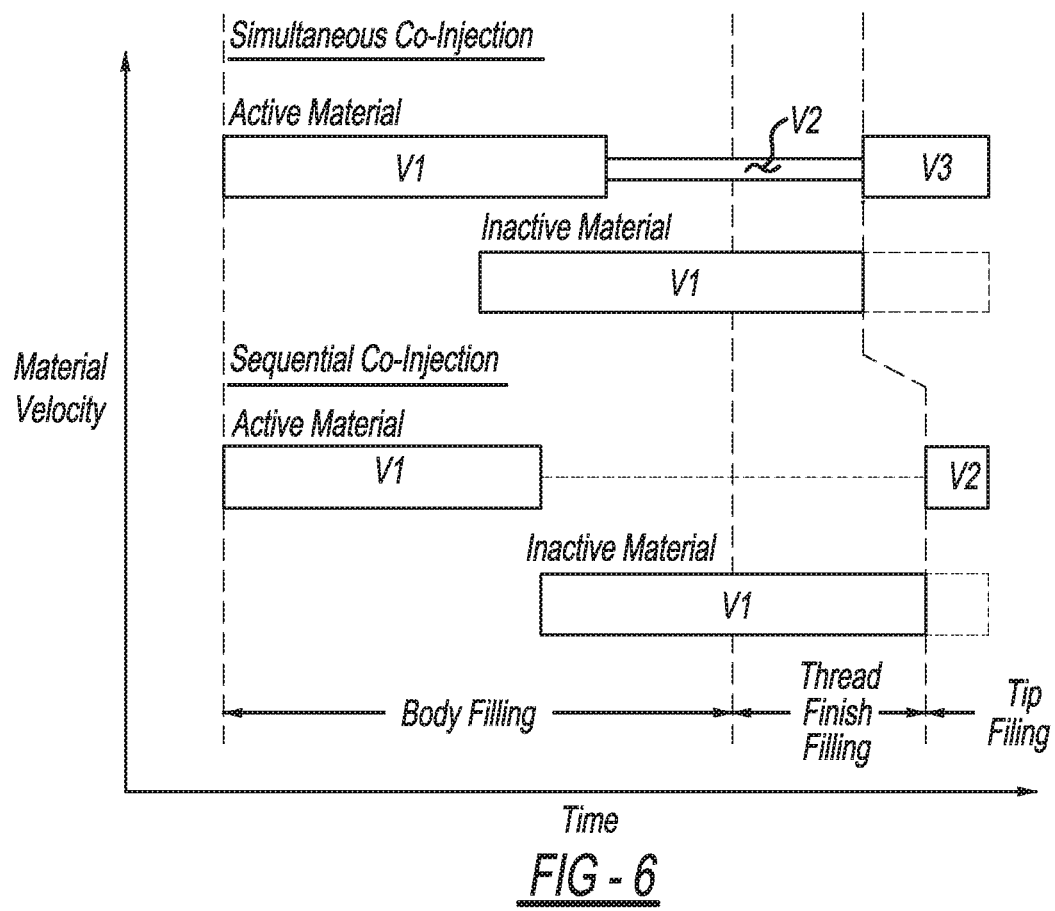
FIG. 6 illustrates steps for manufacturing the preform of FIG. 1 with a simultaneous co-injection process and sequential co-injection process.

The preform 110 can be formed by either a simultaneous co-injection process or a sequential co-injection process, which will now be described with reference to FIG. 6. With a simultaneous co-injection process, a first injection molding extruder injects the outer and inner active materials 80A and 80B with a first velocity V1 and a second velocity V2, which is less than the first velocity V1. When the first extruder reduces to velocity V2, a second injection molding extruder injects the inactive material layer 70 with a velocity of V1 between the outer and inner active materials 80A and 80B causing the inactive material layer 70 to overtake and break through the outer and inner active materials 80A and 80B, and therefore fill the finish 20 of preform 110 with a single layer of inactive material 70. When the finish 20 is completely filled with inactive material 70, the first extruder increases to a third velocity V3 to fill the tip 140 of preform 110 with the outer and inner active materials 80A and 80B, and the inactive material 70.

With a sequential co-injection process, a first injection molding extruder injects the outer and inner active materials 80A and 80B with a first velocity V1 and then stops at a predetermined point of the injection process. When the first extruder stops, a second injection molding extruder injects the inactive material layer 70 with a velocity of V1 between the outer and inner active materials 80A and 80B causing the inactive material layer 70 to break through the outer and inner active materials 80A and 80B, and therefore fill the finish 20 of preform 110 with a single layer of inactive material 70. When the finish 20 is completely filled with inactive material 70, the first extruder increases to a second velocity V2 to fill the tip 140 of preform 110 with the outer and inner active materials 80A and 80B, and the inactive material 70.

For both simultaneous and sequential co-injection molding, optimization of the sequencing and injection timing rates are dependent on material morphology, temperatures, and injection profiling. With a simultaneous co-injection process, a common injection nozzle design will have material fed through a separated manifold combining at or near the preform gate 56. An optimized process will allow material placement in the inactive layer 70 to be moved closer to outer or inner active materials 80A and 80B of the preform as necessary to effectively change the cooling characteristics, of the outer and inner active materials 80A and 80B to improve visual characteristics such as clarity and reduced haze. Yet another nozzle design may also separate the inactive layer 70 into vertical sections to improve layer adhesion.

With a sequential co-injection process, an injection nozzle provides the inlet of inactive material 70 into the center of the melt stream of the outer and inner active materials 80A and 80B. The inactive layer 70 is extended into the finish 20 of the preform 110 when laminar flow creates a flow channel for the inactive material 70 to push the outer and inner active materials 80A and 80B up and out of the way, allowing inactive material 70 to form the finish 20 of the preform 110. This process allows outer and inner active materials 80A and 80B to cool quickest after injection molding, and allows the tip 140 of the preform 110 to be covered with the outer active material 80A. With respect to extruder design, standard co-injection machine configurations require a large first extruder barrel and a small second extruder barrel to prevent material degradation from heat and barrel residence time. The present teachings require a smaller first extruder barrel to avoid large residence time of the outer and inner active materials 80A and 80B, and a larger second extruder barrel to make the inactive material 70 a larger percentage of the total shot size.

Figure 3:
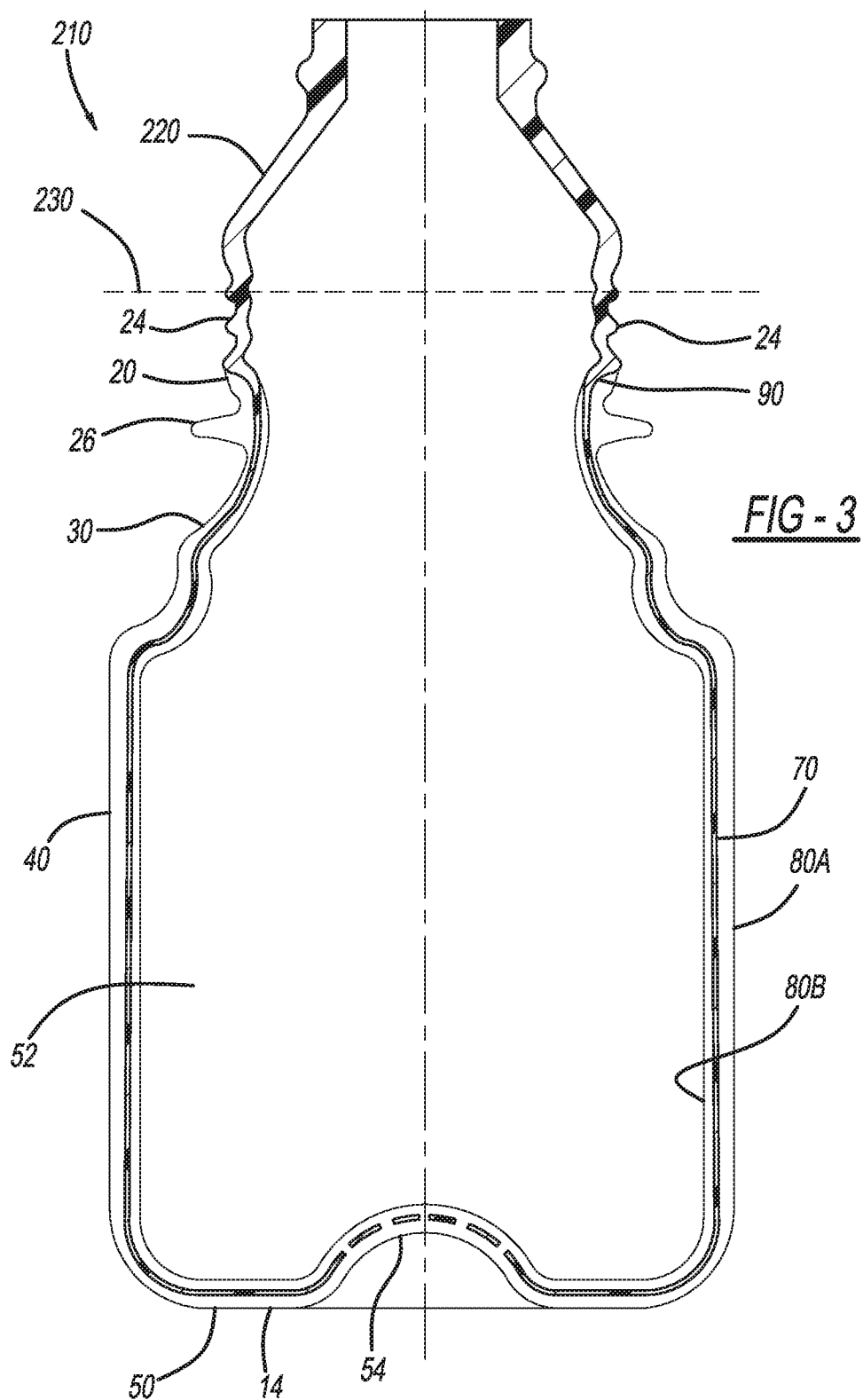
FIG. 3 is a cross-sectional view of another container according to the present teachings.
Figure 4:
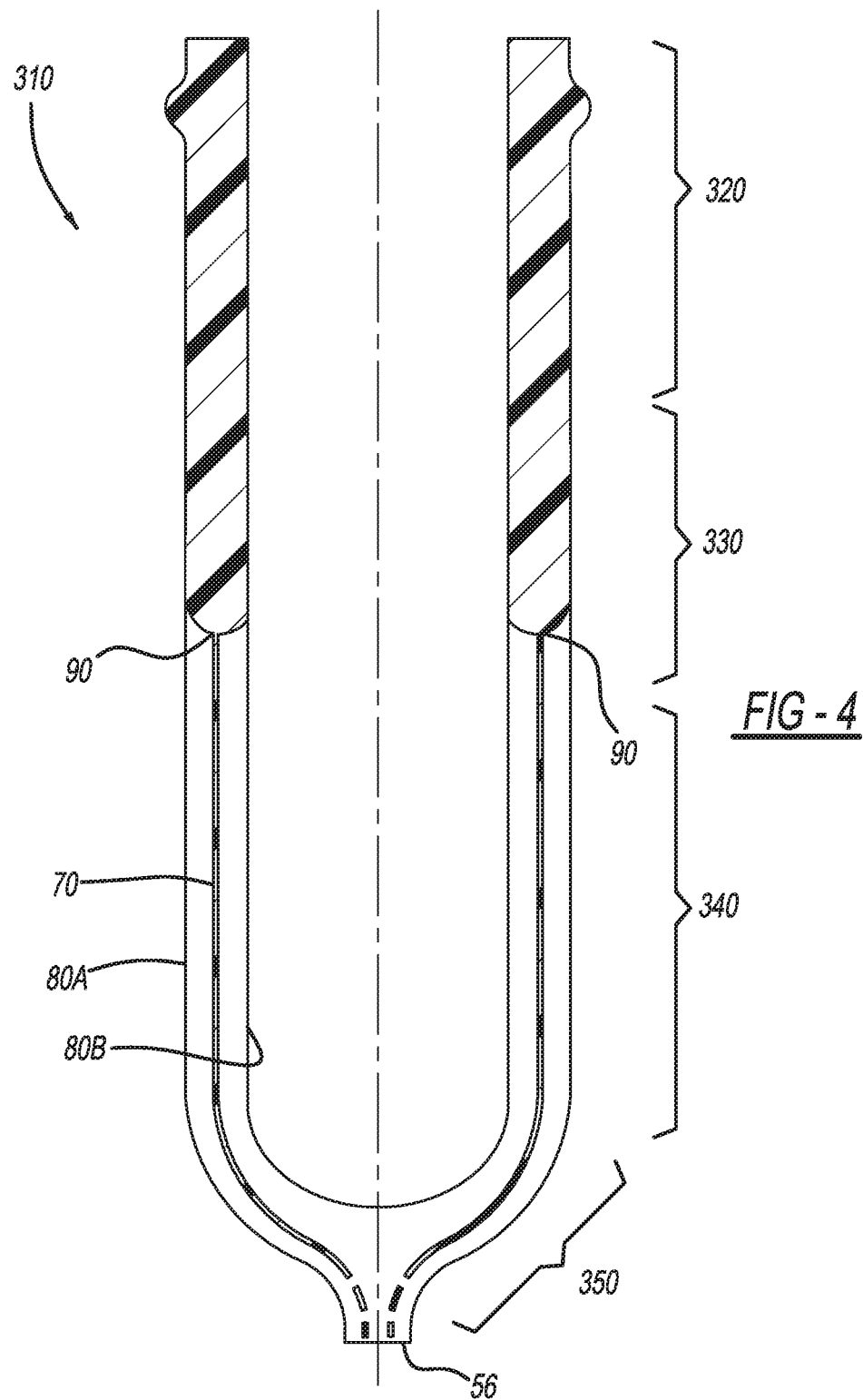
FIG. 4 is a cross-sectional view of another preform according to the present teachings configured for a blow trim finish, the preform configured to form the container of FIG. 3.

With additional reference to FIGS. 3 and 4, the present teachings also apply to containers having a blow-trim finish. FIG. 3 illustrates another exemplary container according to the present teachings at reference numeral 210. The container 210 is substantially similar to the container 10, and thus features of the container 210 that are similar to, or the same as, the container 10 are designated with the same reference numerals. Unlike the container 10, the container 210 is formed from preform 310 of FIG. 4. Thus the container 210 has a blow-trim finish 20, and moil portion 220 extending from the finish 20. The moil portion 220 is separated from the finish 20 at trim point 230, which extends through only the single layer material portion of inactive material 70. Thus the moil 220 includes only the inactive material 70. As a result, the moil 220 can be easily recycled for future use. By trimming through only the single layer material portion at trim point 230, the possibility of layer delamination is eliminated.

The preform 310 includes a moil forming portion 320, a finish forming portion 330, a shoulder/body forming portion 340, and a base forming portion 350. The preform 310 is formed by injecting the inactive material 70 through a mold gate proximate to the gate 56 in order to form the moil forming portion 320 and at least part of the finish forming portion 330. Only the inactive material 70 is injected to form the moil forming portion 320 and at least a portion of the finish forming portion 330. Subsequent to injecting the single layer of the inactive material 70, the outer and inner active materials 80A and 80B are injected through the mold gate at the gate 56 with the inactive material 70 therebetween. The transition area 90 can be at any suitable location, such as in the finish forming portion 330 or the shoulder/body forming portion 340. The gate 56 can then be closed, and the preform 310 can be blow molded to form the container 210 of FIG. 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of forming a preform comprising:
   forming a finish forming portion of the preform, the finish forming portion defining an opening of the preform;
   forming a shoulder forming portion of the preform extending from the finish forming portion;
   forming a body forming portion of the preform extending from the shoulder forming portion;
   forming a base forming portion of the preform;
   injecting a single layer material through a mold gate to form at least a portion of the finish forming portion;
   injecting a multi-layer material portion through the mold gate such that the multi-layer material portion extends from the single layer material to a gate portion of the finish;
   forming a transition area where the single layer material portion transitions to the multi-layer materials portion;
   forming the single layer material portion with an inactive material;
   forming the multi-layer material portion with an active material including an outer active material portion at an exterior of the preform and an inner active material portion at an interior of the perform, the inactive material is arranged between the outer and inner active material portions; and
   forming the pre-form with a simultaneous co-injection process including:
      injecting outer and inner active materials with a first injection molding extruder at a first velocity and a second velocity that is less than the first velocity, the outer and inner active materials form the outer active material portion and the inner active material portion;
      with the first injection molding extruder at the reduced second velocity, injecting with a second injection molding extruder at a velocity lower than the second velocity, the inactive material between the outer and inner active materials causing the inactive material to overtake and break through the outer and inner active materials to fill the finish with the single layer material portion of the inactive material; and
      after the finish is formed, increasing the first extruder to a third velocity that is greater than the second velocity, and filling a tip of the preform with the outer and inner active materials and the inactive material.

2. The method of claim 1, further comprising forming the preform with one of a simultaneous co-injection process or a sequential co-injection process.

3. The method of claim 1, further comprising forming one of the outer active material portion and the inner active material portion to be thicker than another one of the outer active material portion and the inner active material portion.

4. The method of claim 1, further comprising forming the inactive material with a varying thickness along a longitudinal axis of the preform.

5. The method of claim 1, further comprising forming the inactive material such that the inactive material is thicker than each one of the outer and inner active material portions.

6. The method of claim 1, further comprising forming the inactive material such that the inactive material has a thickness greater than one of the outer and inner active material portions.

7. The method of claim 1, further comprising forming the inactive material such that the inactive material is closer to the interior of the preform than the exterior of the preform.

8. The method of claim 1, further comprising forming the inactive material such that the inactive material is closer to the exterior of the preform than the interior of the preform.

9. A method of forming a preform comprising:
   forming a finish forming portion of the preform, the finish forming portion defining an opening of the preform;
   forming a shoulder forming portion of the preform extending from the finish forming portion;
   forming a body forming portion of the preform extending from the shoulder forming portion;
   forming a base forming portion of the preform;
   injecting a single layer material through a mold gate to form at least a portion of the finish forming portion;
   injecting a multi-layer material portion through the mold gate such that the multi-layer material portion extends from the single layer material to a gate portion of the finish;
   forming a transition area where the single layer material portion transitions to the multi-layer materials portion;
   forming the single layer material portion with an inactive material;
   forming the multi-layer material portion with an active material including an outer active material portion at an exterior of the preform and an inner active material portion at an interior of the perform, the inactive material is arranged between the outer and inner active material portions; and
   forming the preform with a sequential co-injection process including:
      injecting outer and inner active materials with a first injection molding extruder at a first velocity for a predetermined period of time, and stopping the first injection molding extruder once the predetermined period of time has ended;
      after the first injection molding extruder has been stopped, injecting the inactive material between the outer and inner active materials at a second velocity that is lower than the first velocity to cause the inactive material to break through the outer and inner active materials and form the finish with the single layer material portion of the inactive material; and
      after forming the finish, operating the first injection molding extruder at a third velocity that approximates the first velocity to fill a tip of the preform with the outer and inner active materials and the inactive material.

10. The method of claim 9, further comprising forming one of the outer active material portion and the inner active material portion to be thicker than another one of the outer active material portion and the inner active material portion.

11. The method of claim 9, further comprising forming the inactive material with a varying thickness along a longitudinal axis of the preform.

12. The method of claim 9, further comprising forming the inactive material such that the inactive material is thicker than each one of the outer and inner active material portions.

13. The method of claim 9, further comprising forming the inactive material such that the inactive material has a thickness greater than one of the outer and inner active material portions.

14. The method of claim 9, further comprising forming the inactive material such that the inactive material is closer to the interior of the preform than the exterior of the preform.

15. The method of claim 9, further comprising forming the inactive material such that the inactive material is closer to the exterior of the preform than the interior of the preform.

* * * * *